United States Patent Office 3,031,357
Patented Apr. 24, 1962

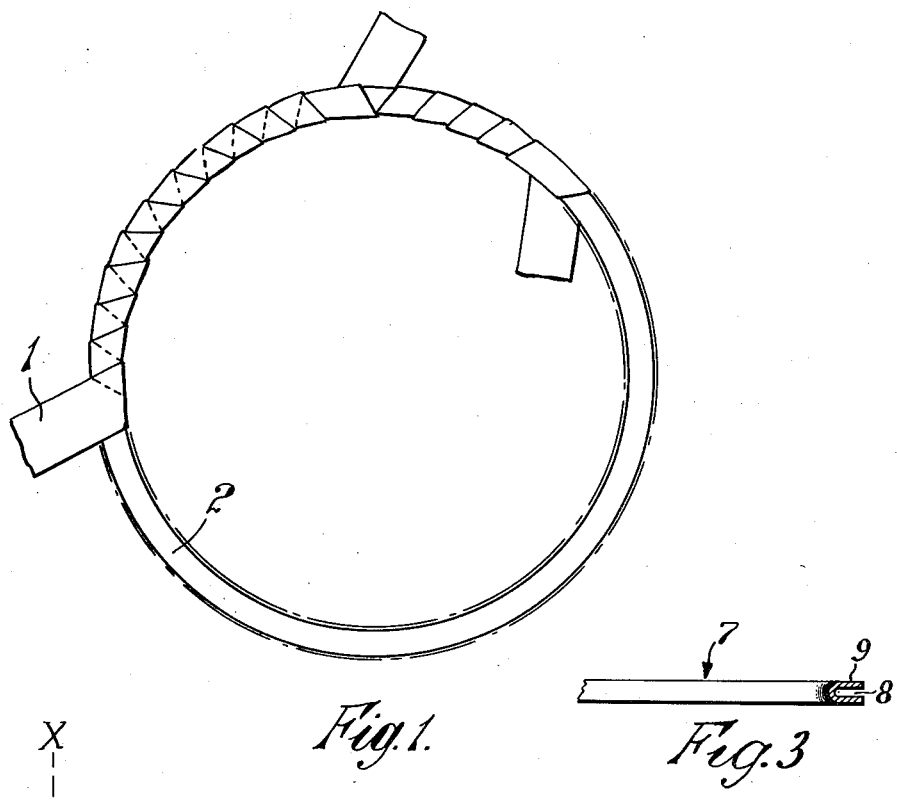

3,031,357
METHOD OF MAKING A POLYTETRAFLUORO-ETHYLENE GASKET ENVELOPE
Mark Balkin and Denys G. Turner, Newcastle-upon-Tyne, England, assignors to George Angus & Company Limited, Newcastle-upon-Tyne, England
Filed Apr. 21, 1958, Ser. No. 729,958
Claims priority, application Great Britain Apr. 25, 1957
1 Claim. (Cl. 156—189)

This invention relates to envelope gaskets and its object is to provide an improved method of making the envelopes thereof from polytetrafluoroethylene which can be processed in a manner to be described.

Envelope gaskets are used to provide seals in joints and the like at which only a relatively low holding pressure can be used, such as in equipment made from porcelain, glass or glass-lined, and consist each of a resilient filler ring, such as of rubber, enclosed in an envelope which is of deep channel cross-section so as to sheath and protect the filler ring. Polytetrafluoroethylene is generally used for the envelope because it is chemically inert, resistant to heat and, although flexible, is capable of holding a high polished surface not easily dented or scratched.

Existing methods of making polytetrafluoroethylene gasket envelopes include moulding from powder or machining from moulded blocks. Both these methods are relatively expensive and are excessively so for large size gaskets which may be up to two feet in diameter. To avoid the expense of moulding or machining, large size envelopes are made from sintered and peeled strip or tape. For example, a cylinder is first moulded and sintered followed by peeling to a suitable thickness. The peeled strip is cut to length, the ends joined together to form an endless band and the borders are then mechanically stretched and finally folded down over an inner filler ring. Large envelope gaskets made in this way have the serious disadvantage of a pronounced joint, which impairs sealing in service, and many attempts have been made to provide a completely jointless envelope for the manufacture of larger-sized gaskets.

According to the present invention, a method of making a gasket envelope of polytetrafluoroethylene material comprises winding thin tape of the material around a mandrel in overlapping layers until a sufficient thickness has been built up and then subjecting the taped mandrel to pressure and to heat to cause merging together of the layers into a homogeneous envelope. By thin tape is meant tape of a thickness which is a sub-multiple of the thickness of material required to form the finished envelope so that the difference in thickness at the edge of an overlap in the wound tape is relatively small and disappears under the pressure and heat.

The tape is wound toroidally on to a ring mandrel, each turn overlapping the previous turn and the direction of winding being reversed in successive layers.

After the taped mandrel has been pressed, and heated, the original layers of tape form a complete, smooth-surfaced sheath enclosing the mandrel. To convert this sheath into a gasket envelope, one peripheral edge, either the inner or the outer according to the type of envelope required, is cut off to reveal the edge of the mandrel and the sheath, having sufficient flexibility, can be opened and stripped from the mandrel without permanent deformation.

The polytetrafluoroethylene tape is of unsintered material, formed conveniently by extrusion. The pressing and heating steps to which the taped mandrel is subjected preferably comprise initial cold pressing, removal from the press of the taped mandrel held between cover plates, heating in an oven to effect sintering during which the polytetrafluoroethylene shrinks slightly and closely embraces the mandrel and finally removal of the mandrel, still between its cover plates, from the oven for final cold pressing which effects rapid cooling.

A typical production of a polytetrafluoroethylene envelope according to the invention will now be described with reference to the accompanying drawings, in which:

FIG. 1 is a plan view of a ring mandrel having tape wound thereon.

FIG. 2 is a fragmentary radial cross-section of a taped mandrel between plates for pressing, and FIG. 3 is a radial section through a completed gasket envelope.

Polytetrafluoroethylene powder of fine particle size is mixed with about 20% by weight of a volatile liquid, such as solvent naphtha, and slightly compressed to a cylindrical preform. The preform is placed in an extrusion press and tape is formed by extrusion through a die. The tape may then be allowed to air dry or passed through an oven to evaporate the volatile liquid. Alternatively, the tape while still moist with the liquid may be used for wrapping a mandrel as described below and the liquid be removed, by air drying or moderate heating, at any suitable stage prior to the final heat treatment. So long as the tape has not been fused by heating, the liquid will migrate through and evaporate from superposed layers of the tape even after cold pressing.

A suitable thickness of extruded tape for the manufacture of gasket envelopes is 0.002" and the width of the tape, although small in relation to the circumference of the envelope to be made, is conveniently proportional to the size of envelope to be made. For example, for making an envelope of 8" internal diameter a suitable width of tape is 1".

As shown by FIG. 1, to make a plane circular envelope the tape 1 is wrapped toroidally around a plane ring mandrel 2 with a half width overlap of successive turns and reversal of direction of winding each time winding once around the mandrel is completed. A convenient mandrel for making an envelope of internal diameter 8" is a steel ring of the same internal diameter, or slightly larger to allow for shrinkage, ½" wide and .080" thick. The mandrel should preferably be chromium-plated so as to avoid discoloration of the polytetrafluoroethylene during sintering. The edge 3 of the mandrel, see FIG. 2, which is to form the closed edge of the envelope, i.e. the base of the deep channel section, should be rounded, so as to avoid sharp bends in the cross-section of the eventual envelope, but the other edge may be square, this facilitating cutting-off of one edge of the sheath from which the envelope is formed, as described later. For making such an 8" envelope, four lengths of tape, each 6 feet long, 1" wide and 0.002" thick, may be used, each length being sufficient for one complete winding of the mandrel with a half overlap between successive turns. This gives four complete layers of tape 1ª, 1ᵇ, 1ᶜ and 1ᵈ as indicated in FIG. 2.

The unsintered polytetrafluoroethylene tape is sufficiently cohesive to permit the handling involved in winding and is slightly tacky so that the turns and layers adhere together well. In this respect, the winding of the tape while still moist may be advantageous.

As indicated in FIG. 2, the taped mandrel is placed between a pair of plane, chromium-plated, steel plates 4 and 5 and pressed cold for a few seconds in a hydraulic press, applying, for example, 10 tons pressure. The taped mandrel between its plates 4 and 5 is now removed from the press and, if the moist tape has been used, allowed to dry or dried by moderate heating, to say 100° C., before being baked in an oven to fusion temperature, for example, for one hour at 360° C. After baking, the taped mandrel between its plates 4 and 5 is quickly replaced in the cold press, immediately subjected to say 10 tons pressure and left to cool for approximately five minutes. After removal from the press a peripheral edge of the polytetrafluoroethylene sheath now formed on the mandrel, in the example illustrated the outer edge 6, is cut off, as indicated by the line X—X in FIG. 2, and the remaining major part of the sheath removed from the mandrel forms the finished envelope.

As shown in radial cross-section by FIG. 3, the envelope is a ring 7 having an outwardly directed channel 8 formed by a U-section wall 9 of even thickness.

An envelope formed in this way is found to have a smooth polished surface and, the polytetrafluoroethylene being translucent, although the lines of overlap of the turns of the tape can be more or less faintly seen crisscrossing at close intervals around the ring, the thickness of the envelope material is uniform and presents no unevenness which would impair surface sealing. In the case of the example given above of an 8″ ring, the finished thickness of the polytetrafluoroethylene is 0.015″.

It will be appreciated that the method provided by the present invention offers a substantial advantage over direct moulding or machining methods. For any size of gasket only a plane steel mandrel ring of appropriate size is required, as compared with the fully shaped mould parts required for direct moulding.

We claim:

A method of making a gasket envelope which comprises preparing a thin tape comprising an unsintered polytetrafluoroethylene and a volatile liquid, winding said tape toroidally around a rigid plane ring mandrel, alternately in opposite directions in superposed layers, pressing said taped mandrel between plane metal plates for a few seconds without heating removing the volatile liquid to dry the tape at any stage in the method thus far effected, subjecting said mandrel with the tape in dried condition thereon to heating to effect sintering of said tape, immediately after said sintering pressing said taped mandrel between unheated plane metal plates until said tape is cool and has become formed into a complete, smooth-surfaced, homogeneous sheath enclosing said mandrel, cutting only one peripheral edge of said sheath to reveal said mandrel and stripping said sheath from said mandrel, said sheath constituting the gasket envelope.

References Cited in the file of this patent

UNITED STATES PATENTS

| | | |
|---|---|---|
| 1,325,955 | Payne | Dec. 23, 1919 |
| 2,459,653 | Keyes | Jan. 18, 1949 |
| 2,459,721 | Poltorak | Jan. 18, 1949 |
| 2,533,501 | Pendleton et al. | Dec. 12, 1950 |
| 2,580,546 | Hobson | Jan. 1, 1952 |
| 2,617,150 | Rubin | Nov. 11, 1952 |
| 2,868,575 | Hawxhurst | Aug. 16, 1954 |
| 2,754,355 | Bartlett | July 10, 1956 |
| 2,767,768 | Jelinek | Oct. 23, 1956 |
| 2,833,686 | Sandt | May 6, 1958 |